US009001114B1

(12) United States Patent
Garrity

(10) Patent No.: US 9,001,114 B1
(45) Date of Patent: *Apr. 7, 2015

(54) PARALLEL PROCESSING OF OBJECT SUBTREES FOR MULTIPROCESSOR SYSTEMS

(71) Applicant: The MathWorks, Inc., Natick, MA (US)

(72) Inventor: Michael P. Garrity, Lexington, MA (US)

(73) Assignee: The MathWorks, Inc., Natick, MA (US)

(*) Notice: Subject to any disclaimer, the term of this patent is extended or adjusted under 35 U.S.C. 154(b) by 150 days.

This patent is subject to a terminal disclaimer.

(21) Appl. No.: 13/913,695

(22) Filed: Jun. 10, 2013

Related U.S. Application Data

(63) Continuation-in-part of application No. 13/629,772, filed on Sep. 28, 2012, now Pat. No. 8,462,146, which is a continuation of application No. 12/102,193, filed on Apr. 14, 2008, now Pat. No. 8,294,704, which is a continuation-in-part of application No. 12/059,300, filed on Mar. 31, 2008, now Pat. No. 8,314,813.

(51) Int. Cl.
| | |
|---|---|
| *G06F 17/00* | (2006.01) |
| *G06T 11/20* | (2006.01) |
| *G06T 17/00* | (2006.01) |
| *G06T 9/40* | (2006.01) |

(52) U.S. Cl.
CPC ............. *G06T 11/206* (2013.01); *G06T 17/005* (2013.01); *G06T 9/40* (2013.01); *G06T 2210/52* (2013.01); *G09G 2352/00* (2013.01)

(58) Field of Classification Search
CPC ... G06T 2210/61; G06T 2210/52; G06T 9/40; G06T 17/005; G06F 9/5027; G09G 2352/00
USPC .................................................. 345/505, 418
See application file for complete search history.

(56) References Cited

U.S. PATENT DOCUMENTS

| | | |
|---|---|---|
| 6,734,852 B2 | 5/2004 | Sowizral et al. |
| 8,294,704 B1 | 10/2012 | Garrity |
| 8,314,813 B1 | 11/2012 | Garrity |
| 2005/0039176 A1 | 2/2005 | Fournie |
| 2009/0109230 A1 | 4/2009 | Miller et al. |

OTHER PUBLICATIONS

Co-pending U.S. Appl. No. 13/629,772, filed Sep. 28, 2012, to Michael P. Garrity, titled "Parallel Processing of Object Subtrees for Multiprocessor Systems", 50 pages.

*Primary Examiner* — Michelle L Sams
(74) *Attorney, Agent, or Firm* — Harrity & Harrity, LLP

(57) ABSTRACT

A system may include a memory that stores instructions and a processor to execute the instructions to receive data for graphical rendering and distribute a first portion of the data to a first computation process. The processor may distribute a second portion of the data to a second computation process and create a first data structure via the first computation process using the first portion of the data. The processor may create a second data structure via the second computation process using the second portion of the data and assemble an object tree via a third computation process using the first data structure and the second data structure. The processor may provide the assembled object tree to a browser for rendering a graphical scene.

20 Claims, 18 Drawing Sheets

RENDERED PLOT 1300

PARALLEL PROCESSING OF OBJECT SUBTREES FOR MULTIPROCESSOR SYSTEMS

RELATED APPLICATIONS

This application claims priority from and is a continuation-in-part (CIP) of U.S. patent application Ser. No. 13/629,772, filed Sep. 28, 2012, entitled "PARALLEL PROCESSING OF OBJECT SUBTREES FOR MULTIPROCESSOR SYSTEMS," which is a continuation of U.S. patent application Ser. No. 12/102,193, filed Apr. 14, 2008 (now U.S. Pat. No. 8,294,704), which is a CIP of U.S. application Ser. No. 12/059,300, filed Mar. 31, 2008 (now U.S. Pat. No. 8,314,813). The contents of these applications are incorporated herein by reference.

BACKGROUND

Contemporary computer systems typically include multi-processor systems, where one of the processors includes a general purpose processor (e.g., a central processing unit (CPU)) and another one of the processors includes a specialized processing unit. The specialized processing unit may include a dedicated processing unit designed to perform a specific function, and is typically used to offload time consuming tasks from the general purpose processor. The specialized processing unit is usually designed to perform the offloaded tasks more efficiently then the general purpose processor. Specialized processing units may include, for example, graphics processing units (GPUs), physics processing units (PPUs), or digital signal processors (DSPs). A GPU is one example of a specialized processing unit typically used in a multiprocessor system which includes a dedicated graphics rendering device that is designed to be efficient at manipulating and displaying computer graphics.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1A:
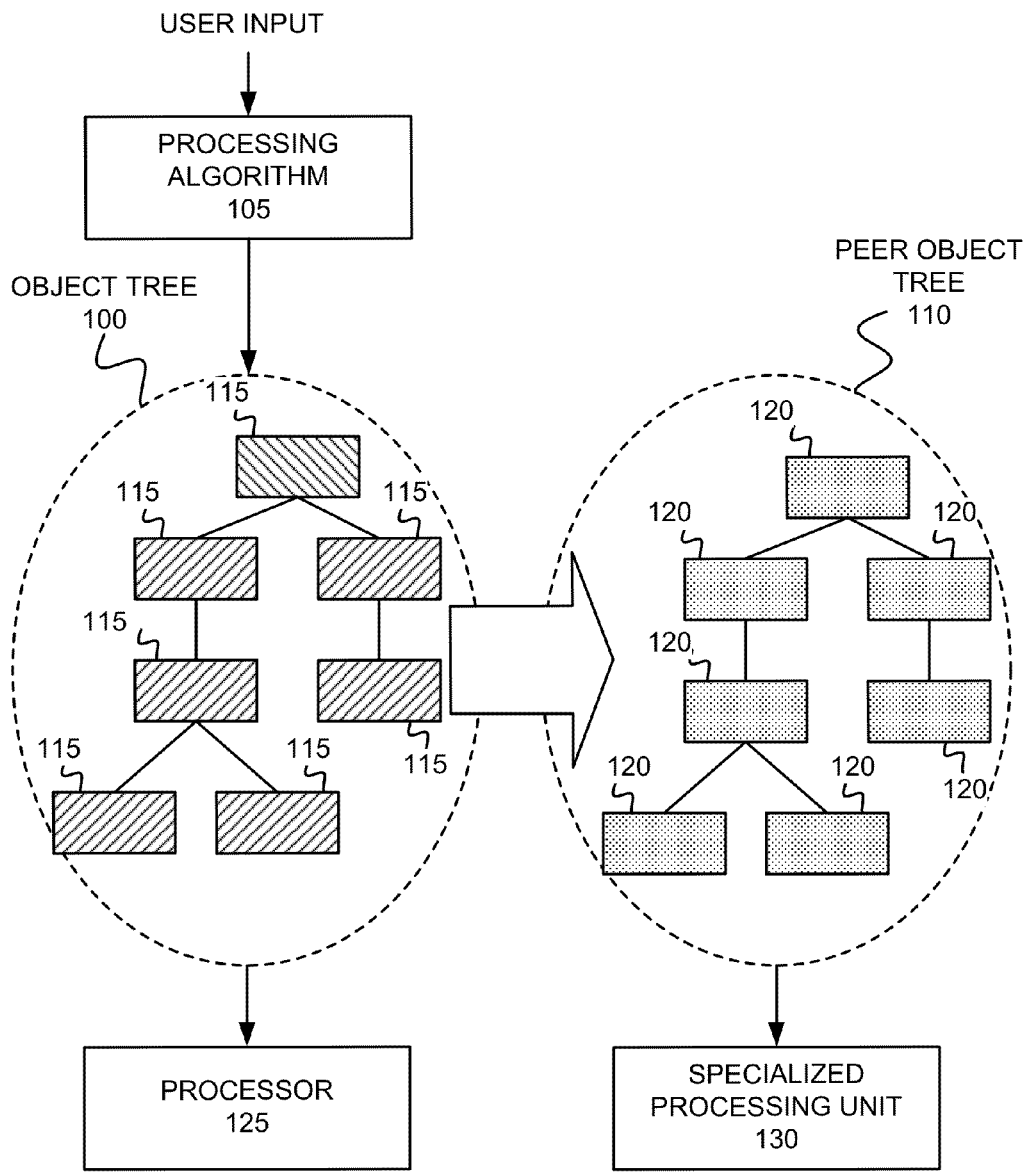
FIGS. 1A and 1B are diagrams depicting an overview of the use of multiple object trees in multiple processor systems according to exemplary implementations.

The following detailed description refers to the accompanying drawings. The same reference numbers in different drawings may identify the same or similar elements. Also, the following detailed description does not limit the invention.

Specialized processing units may utilize certain organizations, types and/or formats of data better than other organizations, types or formats of data. For example, a specialized processing unit may efficiently handle code objects having a certain organization. Code objects (hereinafter "objects") may include pieces of software that are made up of modularized code, where the modules are referred to as "objects." An "object" as the term is used herein refers to a self-contained entity that may consist of both data and manipulation procedures (e.g., functionality). An "object" is a basic building block of programs in object-oriented programming. Data associated with a given object may be set as properties of that object.

In object oriented programming, an object is a piece of code that accepts information and/or makes information available that is compliant with a known or published format (e.g., compliant with a published input or output interface). In object oriented programming, a programmer does not have to be concerned about, or have detailed knowledge of, the code that makes up a given object when the programmer wants to create other code that may use and/or interact with the object. The programmer only needs to make sure his code makes information available to the object in a compliant format and/or receives information from the object via a compliant format. Object oriented programming techniques allow complex programs (e.g., complex graphics programs) to be written by several individuals without requiring that one individual know the details of what is in an object developed by another individual.

Object oriented code may be implemented in an environment that allows objects to be arranged in formations, such as hierarchies. For example, a hierarchy may include objects arranged in a tree-like structure with branches and/or leaves, a parent object and/or child/grandchild objects, etc.

As described herein, multiple object subtrees may be created by processes implemented in parallel by one or more general purpose processors. The multiple object subtrees may then be used to create an object tree that is optimized to provide the best performance from a specialized processing unit. For example, data associated with the object tree may be converted to a format that provides a best performance from the specialized processing unit.

In one exemplary embodiment where the specialized processing unit includes a GPU, a user may specify a graphical scene to be rendered. The embodiment may use multiple processes executed in parallel to create multiple object subtrees that describe respective portions of the graphical scene based on the user specification. A graphics rendering tree may then be created, based on the parallel created object subtrees, where the graphics rendering tree is optimized to provide a certain performance from the GPU (e.g., a specified performance, a threshold performance, a best performance, an optimum performance, etc.). During this optimization, for example, data in the object subtrees may be converted to a format that provides the certain performance from the GPU (e.g., fastest and/or most efficient graphics rendering). In one embodiment, data in each of the object subtrees may be converted to a format that provides the certain performance from the GPU. The GPU may subsequently use the graphics rendering tree to render the graphical scene specified by the user. Use of the optimized graphics rendering tree can enhance the speed and efficiency of the overall graphics rendering process. Creation of the graphics rendering tree, which is optimized to the GPU, prior to rendering the graphics, thus, eliminates "on the fly" data/object conversion which can slow down the rendering process.

Optimization of the graphics rendering tree can mean that data associated with a graphics rendering tree has been converted to a format that maximizes the speed and/or efficiency of use of that data by the GPU, and/or that contents of the graphics rendering tree have been organized and/or ordered (e.g., sorted) to increase the speed and/or efficiency of graphics rendering performed by the GPU. "Certain performance" as referred to herein may include a best performance, an optimum performance, a determined or specified performance and/or a threshold performance. A best performance may mean that a speed associated with the execution of a process by a specialized processing unit (e.g., a GPU) is enhanced (e.g., maximized) relative to using an object tree that has not had its data converted to a format the maximizes the speed and efficiency of use of that data by the GPU, or that has not been organized and/or ordered to increase the speed and efficiency of the graphics rendering performed by the GPU. A "process" as referred to herein may include any type and/or form of computation process (e.g., a task(s), a thread(s) and/or a process(es)).

Overview

FIG. 1A illustrates an overview of an exemplary embodiment that involves the generation of multiple object trees for use by respective ones of multiple processing units, where one of the multiple processing units includes a specialized processing unit. In the exemplary embodiment of FIG. 1A, a peer tree of a first object tree is generated that is optimized to provide the best performance from the specialized processing unit.

As shown in FIG. 1A, a first object tree 100 may be generated based on user input received by a processing algorithm 105, where the contents of object tree 100 may then be used by a processor 125. A peer object tree 110 may be generated, based on the contents of object tree 100, where the contents of peer object tree 110 are optimized to provide the best performance from specialized processing unit 130. Processing algorithm 105 may include any algorithm that can receive user input (or data from another source) and generate an object tree 100 for use by processor 125. Object tree 100 may include one or more objects 115, which may be generated from a library (not shown), a toolbox, or the like, based on the user input and processing algorithm 105. The objects 115 of object tree 100 may be used by processor 125 during algorithm execution. The objects 115 of object tree 100 are depicted as linked in a tree structure. In other implementations, however, the objects 115 may be linked as an acyclic graph or any other suitable linking structure.

Processor 125 may include any general purpose processor, such as, for example, a microprocessor or central processing unit (CPU). Specialized processing unit 130 may include a dedicated processing unit designed to perform a specific function. Specialized processing units are typically used to offload time consuming tasks from a central processing unit (CPU). Specialized processing units may perform the offloaded tasks more efficiently then a general purpose CPU or microprocessor. Specialized processing unit 130 may include, for example, a graphics processing unit (GPU), a physics processing unit (PPU), a digital signal processor (DSP), or other type of specialized processing unit. A GPU may include a dedicated graphics rendering device (e.g., for a personal computer, workstation, or game console) that is designed to be efficient at manipulating and displaying computer graphics. A PPU may include a dedicated microprocessor designed to handle physics calculations such as, for example, a physics engine of a video game. Examples of calculations involving a PPU might include rigid body dynamics, soft body dynamics, collision detection, fluid dynamics, finite element analysis, etc. A DSP may include a specialized processor designed to specifically handle digital signal processing.

Peer object tree 110 (including the contents of each object of peer object tree 110) may be generated from object tree 100 using another library (not shown) based on the contents of object tree 100. The contents of peer object tree 110, including the format of data associated with peer object tree 110, are optimized, relative to the contents of object tree 100, for providing the best performance from specialized processing unit 130. As shown in FIG. 1A, peer object tree 110 may include multiple objects 120. After generation of peer object tree 110, objects 120 may be used by specialized processing unit 130 during algorithm execution. The objects 120 of peer object tree 110 are depicted as linked in a tree structure. In other implementations, however, objects 120 may be linked as an acyclic graph or any other suitable linking structure.

Figure 1B:
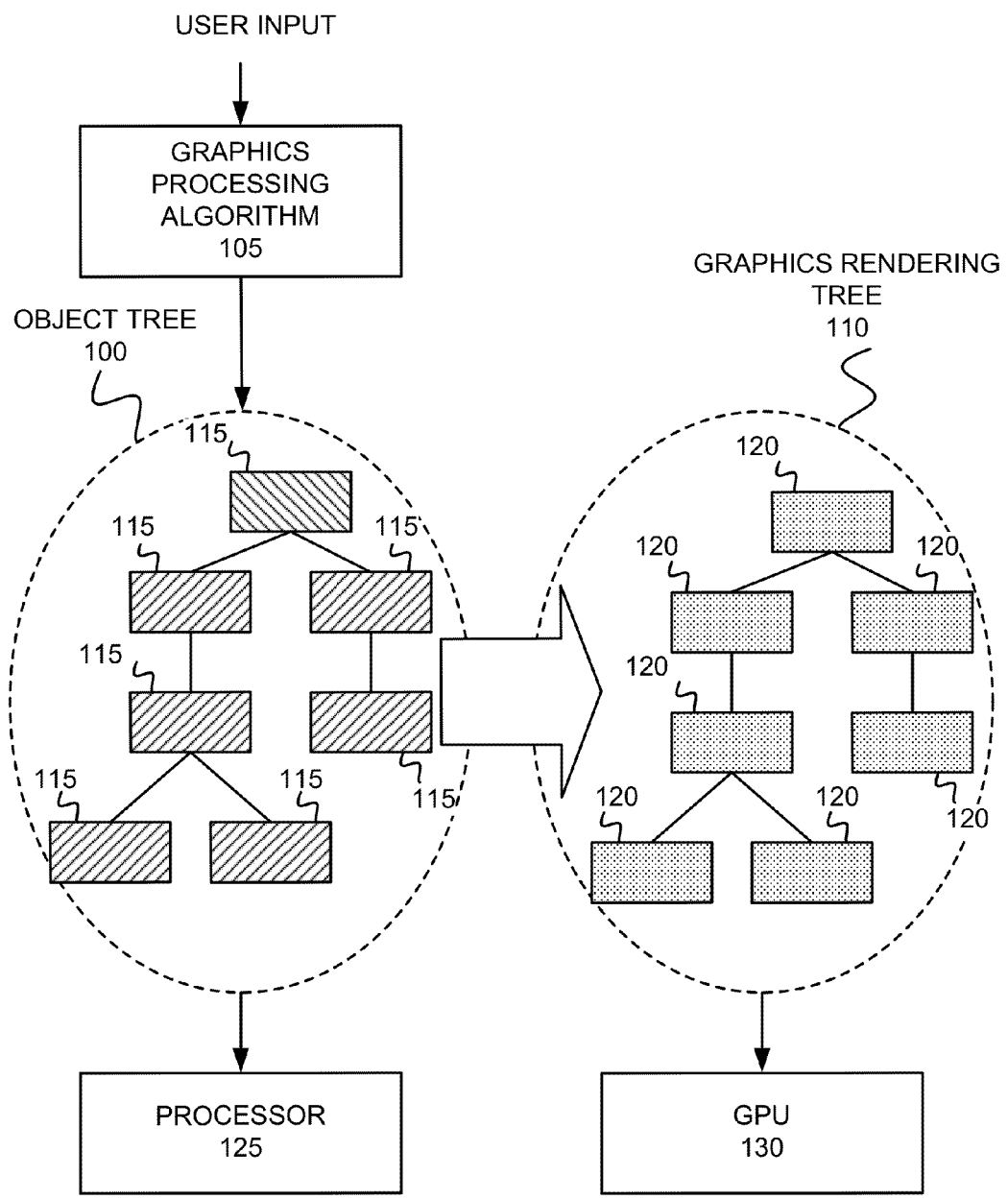

FIG. 1B illustrates an overview of another exemplary embodiment where one of the multiple processors is a GPU. As shown in FIG. 1B, object tree 110 may be generated based on user input received by a graphics processing algorithm 105. The user input received by graphics processing algorithm 105 may select the contents of a specific graphical scene to be displayed and may set the parameters of the graphical scene. A graphics rendering tree 110 may then be generated which is optimized to provide the best performance from GPU 130 based on the contents of object tree 110.

The contents of graphics rendering tree 110, including the format of data associated with graphics rendering tree 110, are optimized, relative to the contents of object tree 100, for providing the best performance from GPU 130. As shown in FIG. 1B, graphics rendering tree 110 may include multiple objects 120 linked in a tree structure. The correspondence between objects in object tree 110 and graphics rendering tree 110 may be maintained through the use of cookies. A cookie can refer to a unique identifier that identifies an object of object tree 100 or graphics rendering tree 110. In an embodiment, each object in object tree 100 may have a cookie that refers to its corresponding object in graphics rendering tree 110. Furthermore, each object in graphics rendering tree 110 may have a cookie that refers to its corresponding object in object tree 100. Thus, implementations described herein may use cookies, instead of pointers, for maintaining correspondences between objects of the two trees. In other implementations, other means of pointing from an object in one tree to its corresponding object in the other tree may be used. For example, pointers, a combination of cookies and pointers, or pointers and/or cookies in combination with other means of pointing may be used.

After generation of graphics rendering object tree 110, objects 120 may be used by GPU 130 during graphics rendering. In other implementations, the rendering process may be broken into multiple tasks that may be performed by multiple GPUs 130. In other implementations, the multiple objects 120 may be linked as an acyclic graph or any other suitable linking structure.

Figure 2:
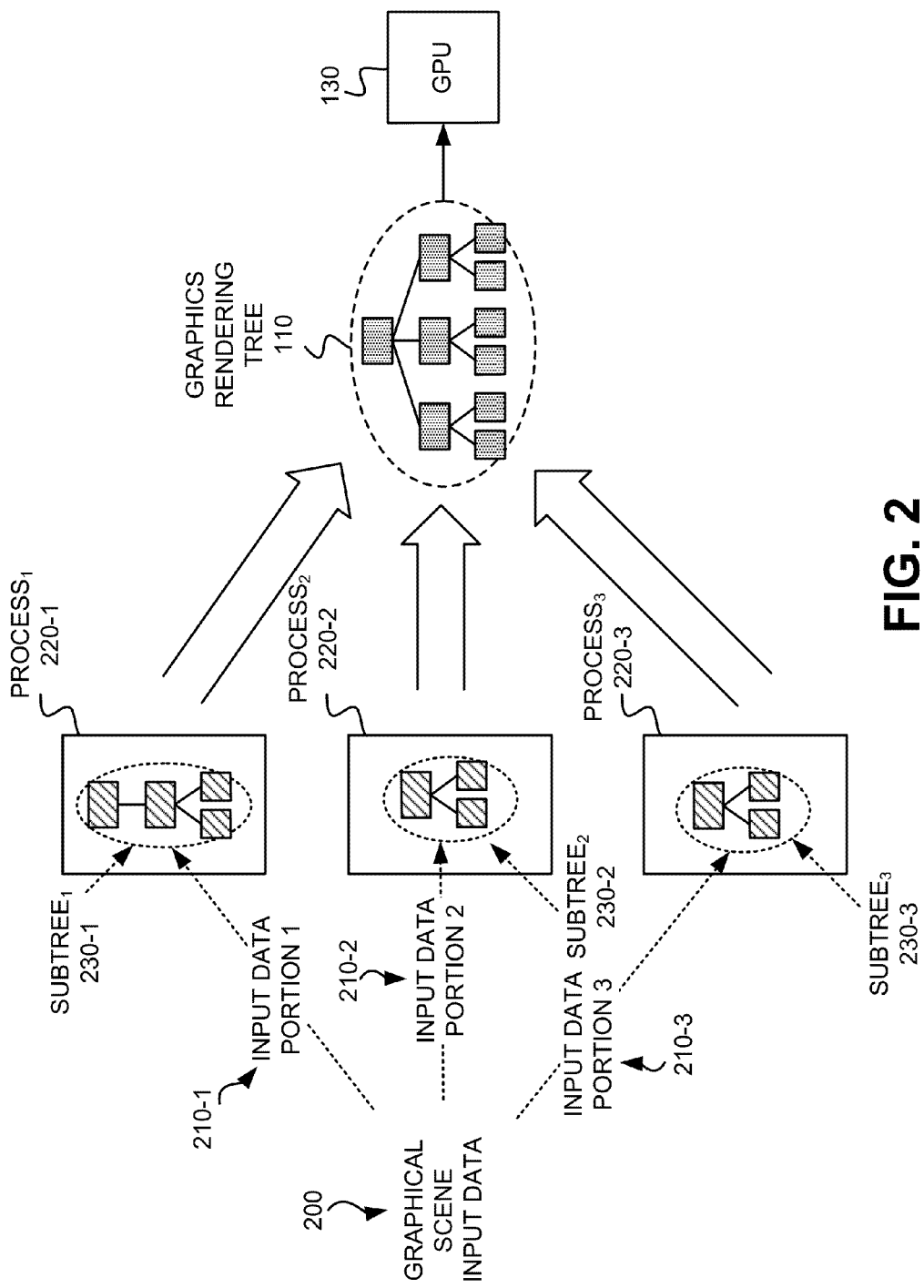
FIG. 2 is a diagram depicting an overview of the use of parallel processes for creating object subtrees that may be used to create a graphics rendering object tree for graphics rendering by a GPU.

FIG. 2 illustrates a further exemplary embodiment in which multiple object subtrees (instead of a single object tree as depicted in FIGS. 1A and 1B), created at multiple processes executed in parallel, may be used to create graphics rendering tree 110. In the exemplary embodiment of FIG. 2, input data 200, that describes a graphical scene, may be split into multiple portions (e.g., portions 210-1, 210-2 and 210-3 shown in FIG. 2) and distributed to parallel processes (e.g., processes 220-1, 220-2 and 220-3 shown in FIG. 2).

As shown in FIG. 2, portion 1 210-1 of input data 200 may be distributed to process$_1$ 220-1 which may then create subtree$_1$ 230-1 based on data portion 1 210-1. Portion 2 210-2 of input data 200 may further be distributed to process$_2$ 220-2 which may then create subtree$_2$ 230-2 based on data portion 210-2. Portion 3 210-3 of input data 200 may also be distributed to process$_3$ 220-3 which may then create subtree$_3$ 230-3 based on data portion 210-3.

Processes 220-1, 220-2 and 220-3 may then create peer objects based on their respective subtrees, convert selected object subtree data to a format that provides a best performance from GPU 130, and provide those peer objects to a process (not shown) for use in assembling graphics rendering tree 110. The peer objects may be provided to one of processes 220-1, 220-2 and 220-3, or to a different process not shown in FIG. 2. GPU 130 may use the assembled graphics rendering tree 110 for rendering the graphical scene. Processes 220-1, 220-2 and 220-3 of FIG. 2 represent different processes that are executed substantially simultaneously. Processes 220-2, 220-2 and 220-3 may be executed by one or more processors.

Exemplary Network

Figure 3:
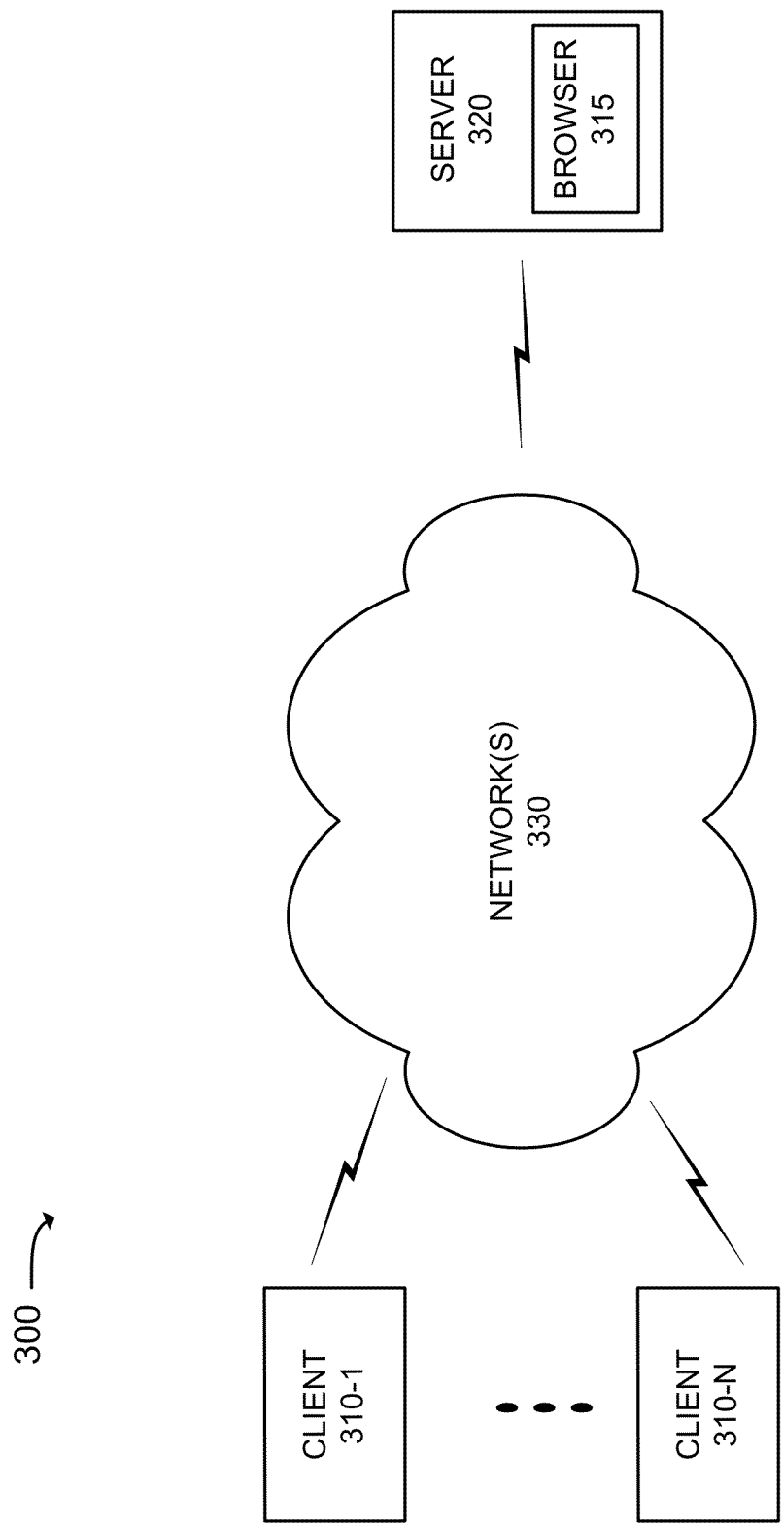
FIG. 3 is a diagram of a network according to an exemplary implementation.

FIG. 3 is an exemplary diagram of a network 300 in which systems and methods described herein may be implemented. Network 300 may include clients 310-1 through 310-N (referred to collectively as clients 310 and individually as client 310) that may connect to a server 320 via one or more network(s) 330. Multiple clients 310 and one server 320 have been illustrated as connected to network(s) 330 for simplicity. In practice, there may be more or fewer clients and servers. Also, in some instances, a client may perform one or more functions of a server and a server may perform one or more functions of a client.

Clients 310 may include devices, such as a personal computer, a wireless telephone, a personal digital assistant (PDA), a lap top, or another type of computation or communication device, a thread or process running on one of these devices, and/or an object executable by one of these devices. Clients 310 may each receive input from respective users, create object trees and corresponding graphics rendering trees, and render graphics based on the graphics rendering trees. Server 320 may include a server device that may, in some implementations, perform various aspects of object tree creation and graphics rendering. For example, in one implementation, client 310 may receive input from a user and create a first object subtree, and client 310 may create a second object subtree. Server 320 may create the corresponding graphics rendering tree and then render the graphics based on the graphics rendering tree using browser 315.

Network(s) 330 may include one or more networks of any type, including a local area network (LAN); a wide area network (WAN); a metropolitan area network (MAN); a satellite network; a telephone network, such as the Public Switched Telephone Network (PSTN) or a Public Land Mobile Network (PLMN); an intranet, the Internet; or a combination of networks. The PLMN(s) may further include a packet-switched sub-network, such as, for example, General Packet Radio Service (GPRS), Cellular Digital Packet Data (CDPD), or Mobile IP sub-network.

Exemplary Architecture

Figure 4:
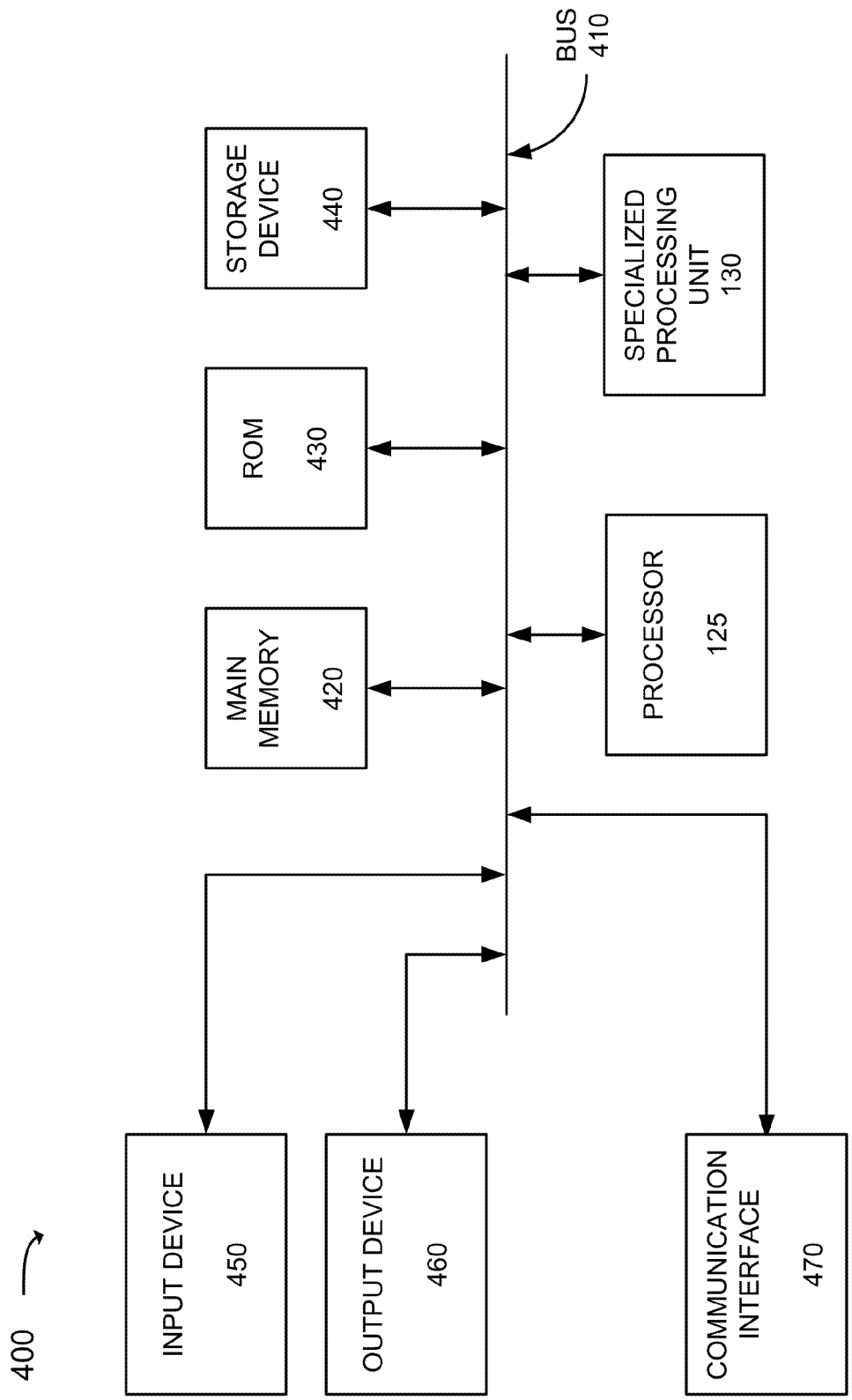
FIG. 4 is a block diagram of a device according to an exemplary implementation.

FIG. 4 is an exemplary diagram of a device 400 that may correspond to client 310 or server 320. Device 400 may include a bus 410, a processor 125, a specialized processing unit 130, a main memory 420, a read only memory (ROM) 430, a storage device 440, an input device 450, an output device 460, and a communication interface 470. Bus 410 may include a path that permits communication among the elements of device 400.

Processor 125 may include a processor, microprocessor, or processing logic that may interpret and execute instructions. Processor 125 may include, for example, a general purpose processor or microprocessor (e.g., a CPU). Specialized processing unit 130 may include a dedicated processing unit designed to perform a specific function, such as, for example, a graphics processing unit (GPU), a physics processing unit (PPU), a digital signal processor (DSP), or another type of specialized processing unit. Main memory 420 may include a random access memory (RAM) or another type of dynamic storage device that may store information and instructions for execution by processor 125 and/or specialized processing unit 130. ROM 430 may include a ROM device or another type of static storage device that may store static information and instructions for use by processor 125 and/or specialized processing unit 130. Storage device 440 may include a magnetic, optical, and/or solid state (e.g., Flash memory) recording medium and its corresponding drive.

Input device 450 may include a mechanism that permits an operator to input information to device 400, such as a keyboard, a mouse, a pen, voice recognition and/or biometric mechanisms, etc. Output device 460 may include a mechanism that outputs information to the operator, including a display, a printer, a speaker, etc. Communication interface 470 may include any transceiver-like mechanism that enables device 400 to communicate with other devices and/or systems. For example, communication interface 470 may include mechanisms for communicating with another device or system via a network, such as network(s) 330.

Device 400, consistent with the embodiments described herein, may perform certain operations or processes, as will be described in detail below. Device 400 may perform these operations in response to processor 125 and/or specialized processing unit 130 executing software instructions contained in a computer-readable medium, such as memory 420. A computer-readable medium may be defined as a physical or logical memory device.

The software instructions may be read into main memory 420 from another computer-readable medium, such as data storage device 440, or from another device via communication interface 470. The software instructions contained in memory 420 may cause processor 125 and/or specialized processing unit 130 to perform operations or processes that will be described later. Alternatively, hardwired circuitry may be used in place of or in combination with software instructions to implement embodiments described herein. Thus, implementations described herein are not limited to any specific combination of hardware circuitry and software.

Although FIG. 4 shows example components of device 400, in some implementations, device 400 may include fewer, different, or additional components than those depicted in FIG. 4.

Exemplary Client Functional Diagram

Figure 5:
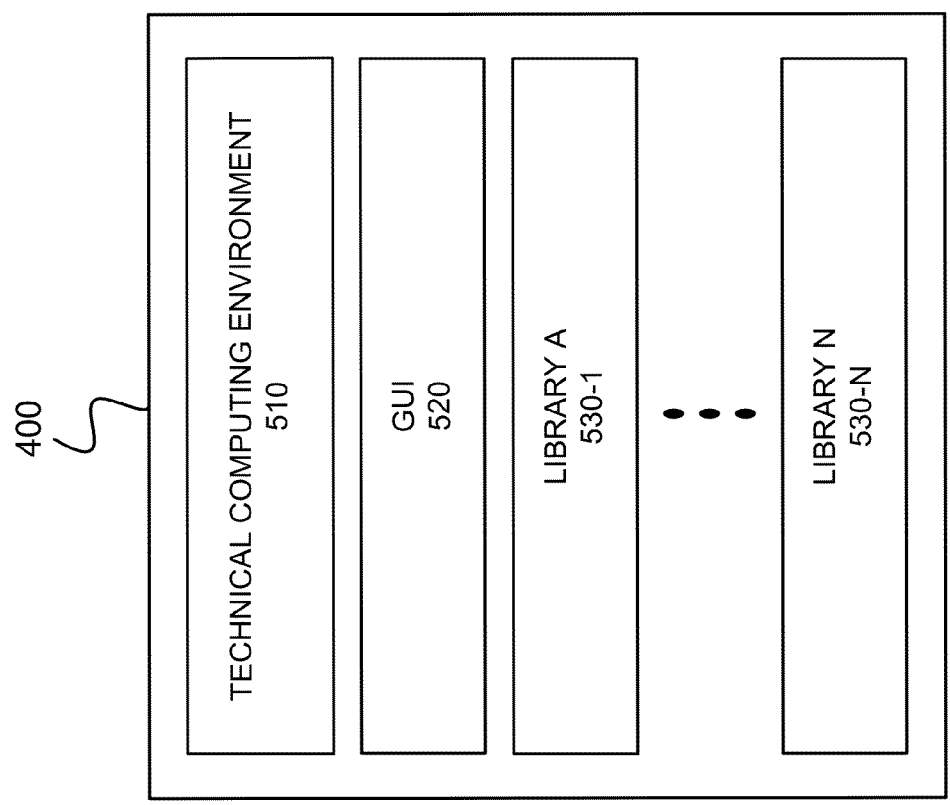
FIG. 5 is an exemplary functional block diagram of the device.

FIG. 5 is an exemplary functional diagram of device 400. The diagram of FIG. 5 depicts functional components that may be implemented by processor 125, or in the case of data or objects, implemented in memory 420, ROM 430 or storage device 440. As depicted in FIG. 5, at a functional level, device 400 may include a technical computing environment (TCE) 510, a graphical user interface (GUI) 520, and libraries A 530-1 through N 530-N.

TCE 510 may include any hardware and/or software based logic that provides a computing environment that allows users to perform tasks related to disciplines, such as, but not limited to, mathematics, science, engineering, medicine, business, etc. In one implementation, TCE 510 may include a dynamically-typed programming language (e.g., the M language) that can be used to express problems and/or solutions using mathematical notations. For example, one or more languages provided in TCE 510 may use an array as a basic element, where the array may not require dimensioning. TCE 510 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 510 may further provide mathematical functions and/or graphical tools (e.g., for creating plots, surfaces, images, volumetric representations, etc.). In one implementation, TCE 510 may provide these functions and/or tools using toolboxes (e.g., toolboxes for signal processing, image processing, data plotting, parallel programming, etc.). In another implementation, TCE 510 may provide these functions as block sets. In still another implementation, TCE 510 may provide these functions in another way, such as via a library, etc.

TCE 510 may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; Ptolemy from the University of California at Berkeley; etc.), a graphically-based environment (e.g., Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; aspects of a Unified Modeling Language (UML) or SysML environment; etc.), or another type of environment, such as a hybrid environment that includes one or more of the above-referenced text-based environments and one or more of the above-referenced graphically-based environments.

GUI 520 may include any type of graphical interface that may receive user input and may cause one or more graphics to be rendered for display. For example, GUI 520 may receive user input that selects a type of graphics to be displayed and the parameters of the graphics, and subsequently cause the graphics to be displayed.

Library A 530-1 may include a library of objects, and associated data, that may be used for constructing an object tree or acyclic graph that, for example, describes a graphical scene. In other implementations, a toolbox may be used instead of, or in addition to, library A 530-1. Library A 530-1 may be accessed to retrieve appropriate objects which can be assembled in the object tree for describing the graphical scene. For example, in one embodiment, library A 530-1 may be accessed based on user input. Various different objects may be stored in library A 530-1 depending on the type of processing algorithm 105 being implemented. If the processing algorithm (e.g., processing algorithm 105) includes a graphics processing algorithm, examples of objects that may be contained in library A 530-1 include (but are not limited to) an "axes" object, a "dataspace" object, a "surface" object, a "ruler" object, a "line" object, a "quadrilateral" object and a "text" object. The "axes" object includes a composite object that groups together a number of simpler objects to provide a better user interface. When an "axes" object is created, one or more additional simpler objects are created including, for example, a "dataspace" object, a "colorspace" objects, one or more "ruler" objects, a "box" object and/or a "clipnode" object. These simpler objects may be called "child properties" and the "axes" object may provide a set of properties that is a subset of the properties of the child properties. The properties of the "axes" object "passes through" to the properties of the child properties.

The "dataspace" object may include functionality for mapping data values associated with a graphical scene to coordinates and/or colors. The "surface" object may include functionality for generating a visual representation of a function over a two dimensional parametric domain. The "surface" object may have three properties named "XData," "YData," and "ZData." The "XData" property may specify the X coordinates of columns of the parametric space. The "YData" may specify the Y coordinates of columns of the parametric space. The "XData" and "YData" may include one dimensional vectors with M values in the "YData" and N values in the "XData." The "ZData" property may define the Z coordinates of the space and may include a two dimensional array with dimensions M×N. The "ruler" object may include functionality for drawing tick marks and labels for one axis of the "Axes" object. The "axes" object may create one ruler for the X axis, another for the Y axis, and another one for the Z axis. The "ruler" object may draw things by creating two child objects. One of the two child objects may include the "line" object that draws the tick marks. The other of the two child objects may include the "text" object that draws the labels. The "line" object may include functionality for rendering one or more continuous or disjoint line segments. The "quadrilateral" object may include functionality for drawing three dimensional coordinates and for filing the interioer of a bounding quadrilateral. The "quadrilateral" object may also fill the interior of a bounding quadrilateral with a solid color, may interpolate four input colors, or may perform lighting calculations. The "text" object may include functionality for drawings characters to the screen in the graphical scene.

Library N 530-N may include another library of objects, and associated data, that may be used for constructing a peer object tree or subtree, such as, for example, graphics rendering tree 110, that may be used by a GPU for rendering the graphical scene described by the object tree. In other implementations, a toolbox may be used instead of, or in addition to, library N 530-N. Library N 530-N may be accessed to retrieve appropriate objects, based on the contents of a corresponding object tree or subtree, which can be assembled in the graphics rendering object tree for use by the GPU. Various different objects may be stored in library N 530-N depending on the type of processing algorithm 105 being implemented. The contents of library N 530-N may be changed due to, for example, changing performance characteristics of the specialized processing unit (e.g., the GPU). In other implementations, another library may be "ported" to enable the use of different objects in the peer object tree (e.g., graphics rendering tree). If the processing algorithm includes a graphics processing algorithm, examples of objects that may be contained in library N 430-N include (but are not limited to) a "viewport" object, a "camera" object, a "group" object and a "geode" object.

A "viewport" object may include functionality for controlling the size and position of the window in which the graphical scene is rendered. A "camera" object may include functionality for transforming a given coordinate system to the rendering system coordinates. For example, a "camera" object may define a mapping from three dimensional world coordinates to two dimensional coordinates within the current viewport. A "group" object may act as a placeholder so that the structure of the object tree and peer object tree match. A "geode" object may include functionality for causing aspects of the graphical scene to be drawn (e.g., points, lines, triangles or quadrilaterals).

Although FIG. 5 shows example functional components of device 400, in some implementations, device 400 may include fewer, different or additional functional components than those depicted in FIG. 5.

Exemplary Tree Creation Using Parallel Processes

Figure 6A:
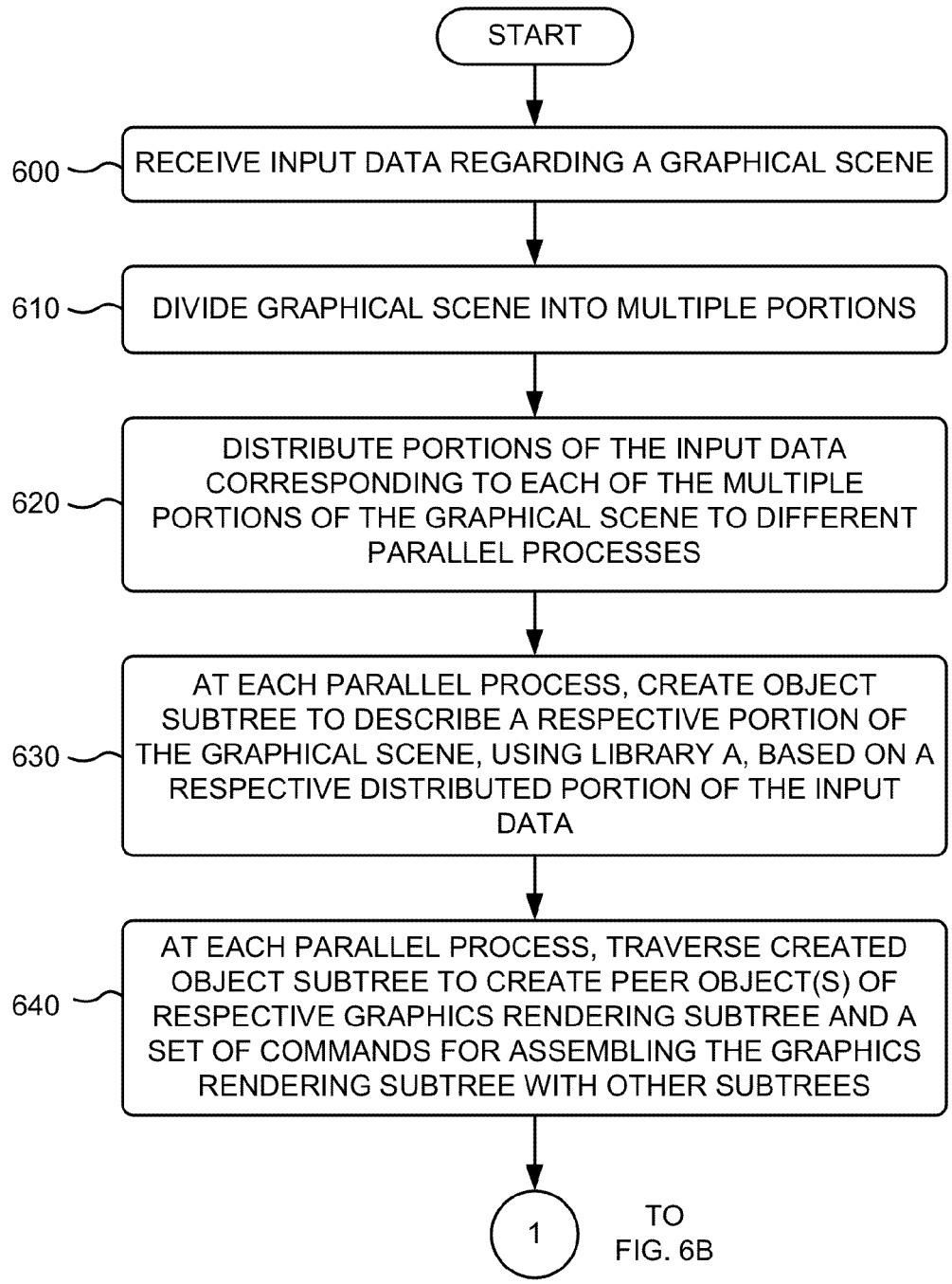
FIGS. 6A and 6B are flowcharts of exemplary activities associated with parallel processes that create object subtrees to describe portions of a graphical scene, and use of those object subtrees to create a graphics rendering tree for rendering the graphical scene via a GPU.
Figure 6B:
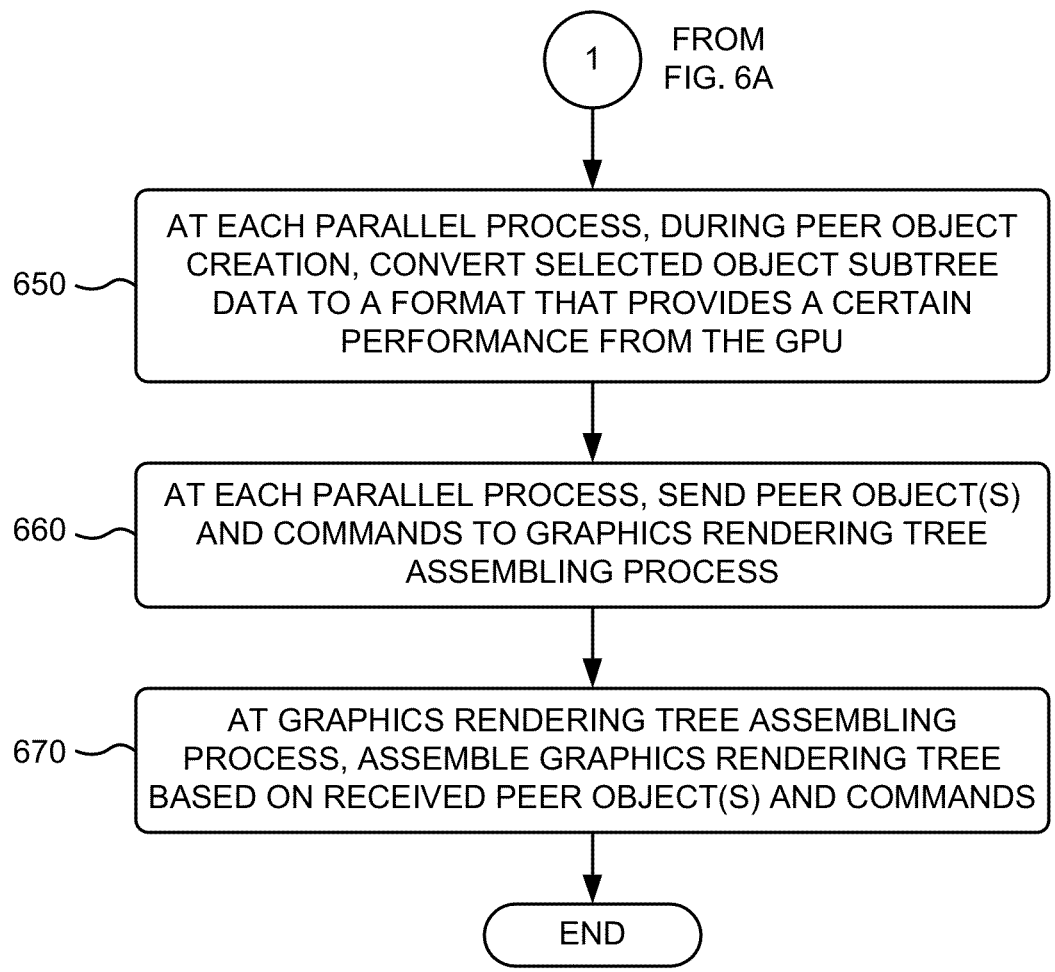

FIGS. 6A and 6B are flowcharts of exemplary activities associated with creating a graphics rendering tree for use in describing a graphical scene and for rendering the graphical scene via a GPU based on object subtrees created at multiple processes. The exemplary activities of FIGS. 6A and 6B may be performed by one or more processors associated with respective clients 210 or with server 220.

Figure 7:
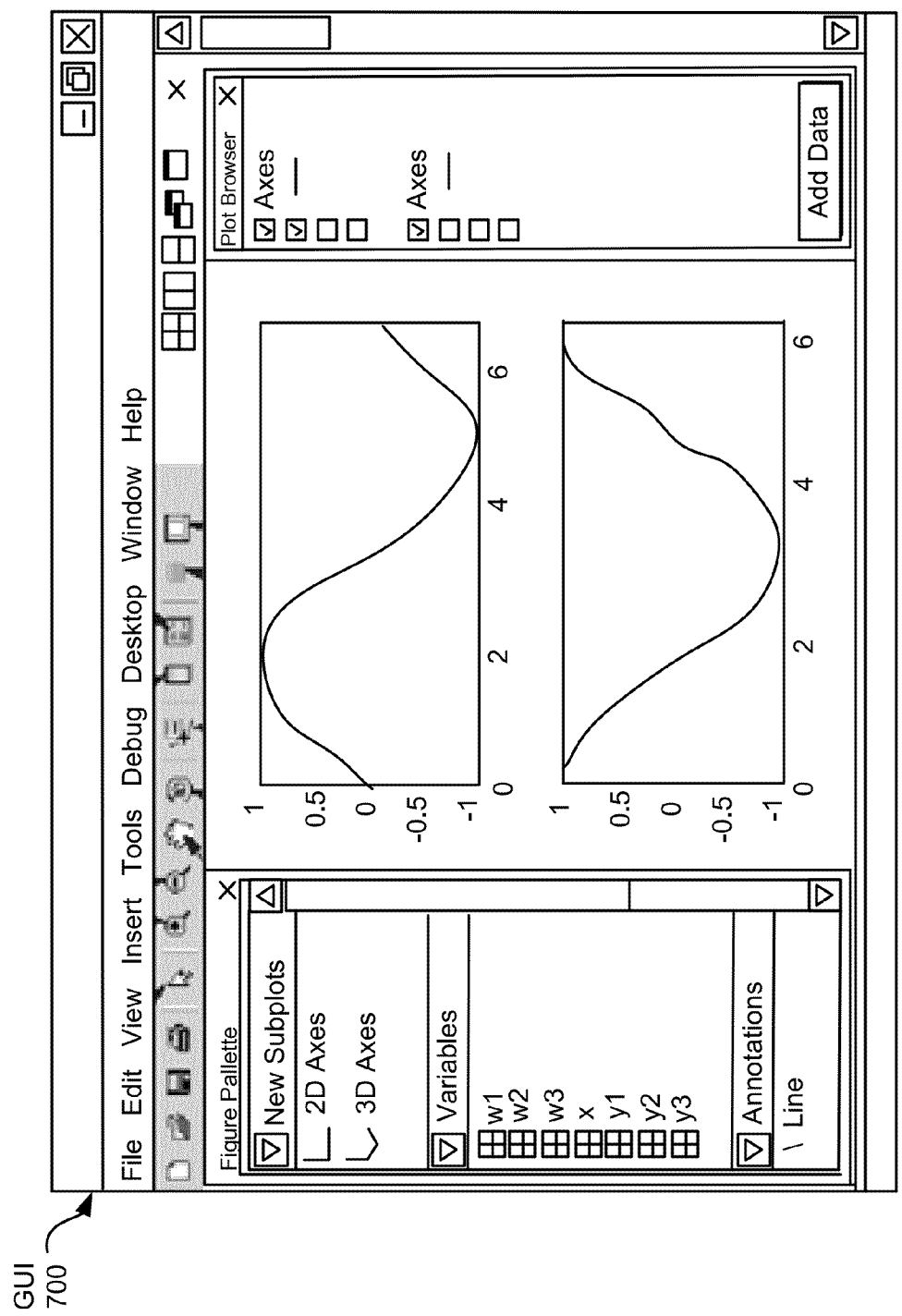
FIG. 7 is a diagram of an exemplary graphical user interface that may be implemented at a client.

The exemplary process may begin with the receipt of input data regarding a graphical scene (block 600). The input data may specify a type of graphical scene that is to be rendered, including parameters associated with the graphical scene. For example, the graphical scene may be a three dimensional graph and the parameters may include x, y and z values that are to be plotted in the three dimensional graph. A user may, for example, use a graphical user interface (GUI) at client 310 to enter the input data for specifying the graphical scene. FIG. 7 illustrates an exemplary GUI 700 that a user may use to enter data for specifying the graphical scene. GUI 700 may be displayed by browser 315. The GUI, similar to GUI 700 shown in FIG. 7, may include various fields, windows, or data entry portions that permit the user to enter the input regarding the graphical scene. The GUI may include fields, windows or data entry portions for entering or identifying graphical scene parameters, labels, etc.

Figure 8:
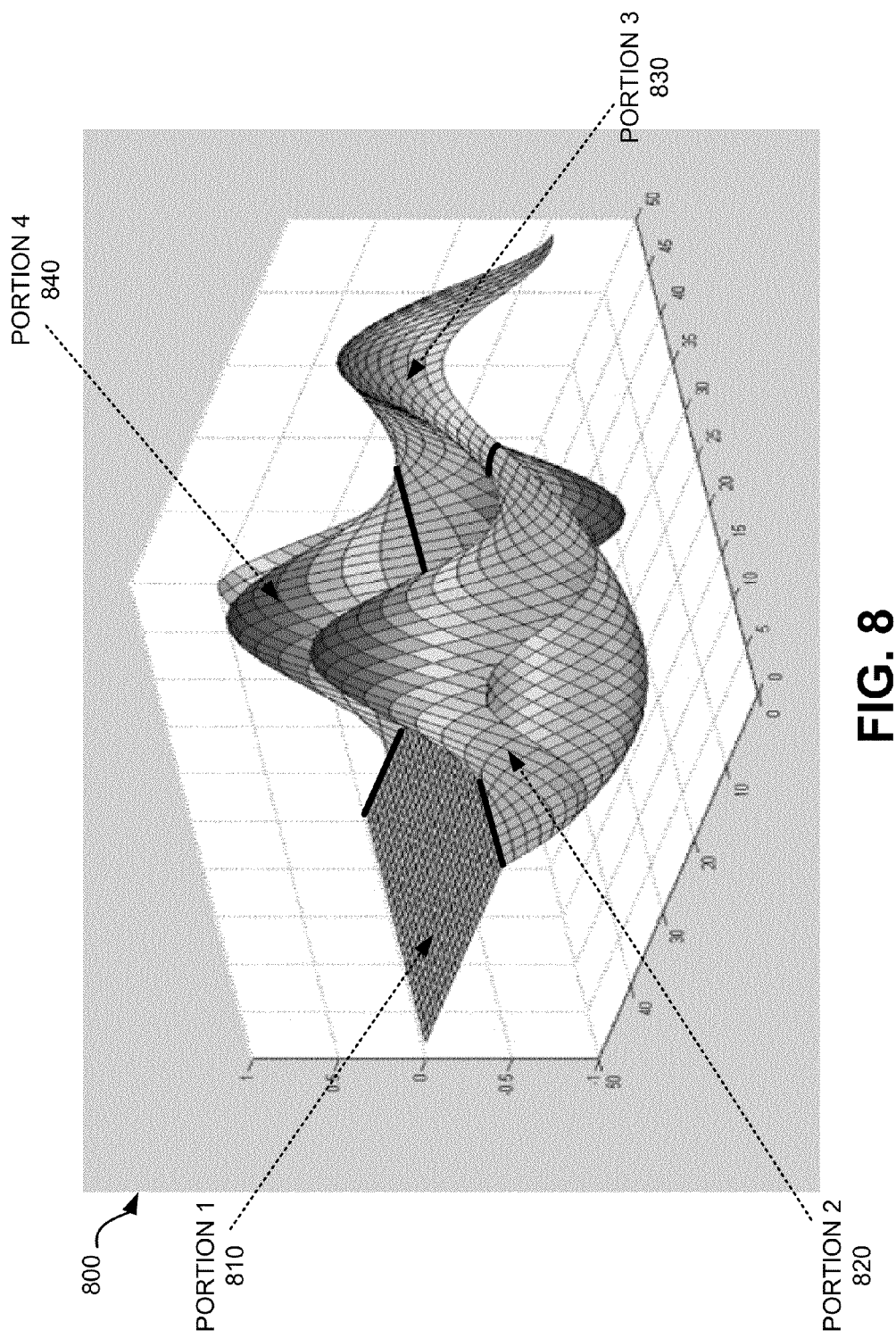
FIG. 8 is a diagram of portions of an exemplary graphics plot.

The graphical scene may be divided into multiple portions (block 610). To divide the graphical scene into multiple portions, the input data may, for example, be divided into multiple portions. FIG. 8 depicts one illustrative example of the division of a graphical scene 800 into multiple portions. As shown in FIG. 8, graphical scene 800 may be divided into four different portions: portion 1 810, portion 2 820, portion 3 830 and portion 4 840. In the example of FIG. 8, portion 1 810 includes the portion of graphical scene 800 having negative x values and positive y values, portion 2 820 includes the portion of graphical scene 800 having negative x values and negative y values, portion 3 830 includes the portion of graphical scene 800 having positive x values and negative y values, and portion 4 840 includes the portion of graphical scene 800 having positive x values and positive y values.

Portions of the input data corresponding to each of the multiple portions may be distributed to different parallel processes (block 620). Referring to the illustrative example of FIG. 8, respective portions of input data corresponding to each of portion 1 810, portion 2 820, portion 3 830 and portion 4 840 may be distributed to parallel processes. The parallel processes may reside at a single client 310 or at server 320, or may be distributed among one or more of clients 310-1 through 310-N and server 320.

Figure 9:
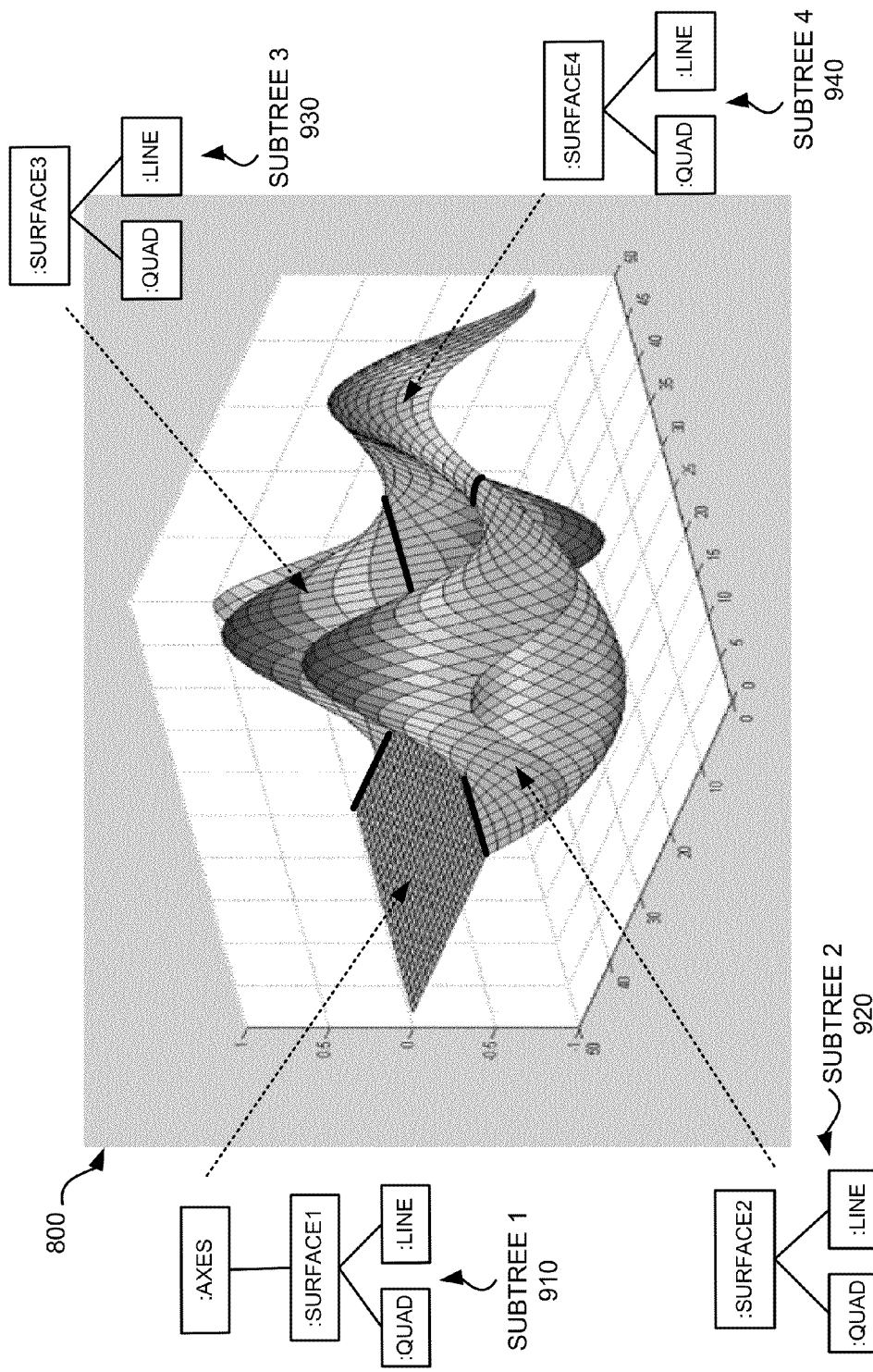
FIG. 9 is a diagram of object subtrees that may be created to describe portions of the exemplary graphics plot of FIG. 8.
Figure 10:
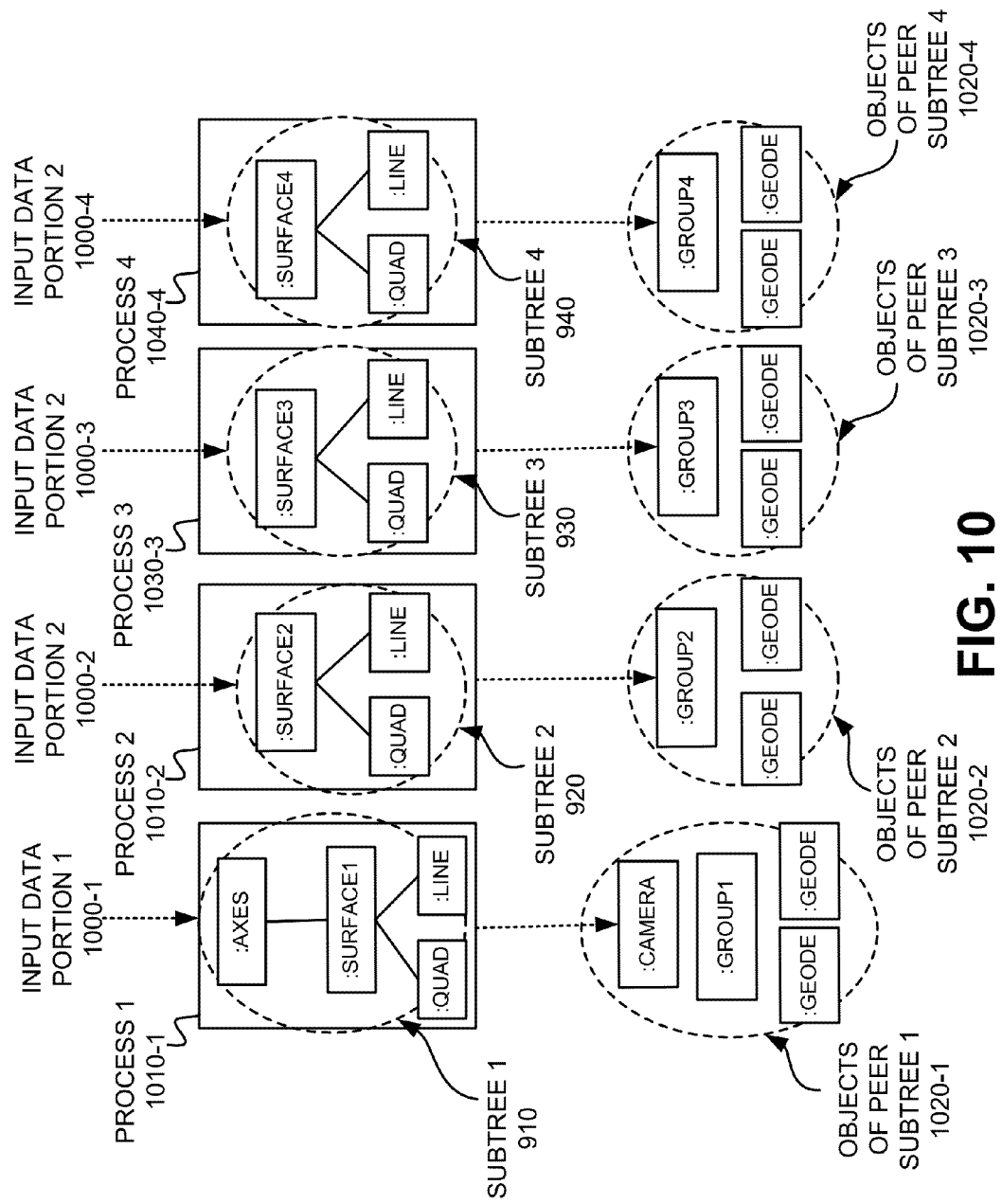
FIG. 10 is a diagram illustrating an example of the creation of object subtrees, and corresponding peer subtrees, by parallel executed processes.

At each parallel process, an object subtree may be created to describe a respective portion of the graphical scene, using library A 530-1, based on a respective distributed portion of the input data (block 630). Library A 530-1 may be used to retrieve appropriate objects to describe the respective portion of the graphical scene specified by the user, with properties of the retrieved objects being set based on parameters provided by the user. FIG. 9 depicts an illustrative example of subtrees created for each portion of graphical scene 800. For example, subtree 1 910 may be created based on the portion of input data corresponding to portion 1 810 of graphical scene 800, subtree 2 920 may be created based on the portion of input data corresponding to portion 2 820 of graphical scene 800, subtree 3 930 may be created based on the portion of input data corresponding to portion 3 830 of graphical scene 800 and subtree 4 940 may be created based on the portion of input data corresponding to portion 4 840 of graphical scene 800. FIG. 10 further depicts subtrees 910, 920, 930 and 940 being created by respective processes 1010-1, 1010-2, 1010-3 and 1010-4. Process 1 1010-1 may create subtree 1 910 based on input data portion 1 1000-1 using library A 530-1. Process 2 1010-2 may further create subtree 920 based on input data portion 2 1000-1 using library A 530-1. Process 3 1010-3 may additionally create subtree 930 based on input data portion 3 1000-3 using library A 530-1. Process 4 1010-04 may also create subtree 940 based on input data portion 4 1000-4 using library A 530-1. In some embodiments, the parallel processes that share the distributed data may communicate between one another. For example, an "axes" object, handled by one process, may need to know the limits of "surface" objects, handled by other processes, to choose appropriate properties of a corresponding peer object.

At each parallel process, the created object subtree may be traversed to create peer object(s) of a respective graphics rendering subtree and a set of commands for assembling the graphics rendering subtree with other subtrees (block 640). The peer object(s) of the respective graphics rendering subtree may be created using library N 530-N. Each object in an object subtree (e.g., each object in subtree 1 910, subtree 2 920, subtree 3 930 and subtree 4 940) may have one or more corresponding graphics rendering objects that may be retrieved from library N 530-N. For example, as shown in FIG. 10, process 1 1010-1 may create the objects of peer subtree 1 1020-1 based on subtree 1 910, process 2 1010-2 may create the objects of peer subtree 2 1020-2 based on subtree 2 920, process 3 1010-3 may create the objects of peer subtree 3 1020-3 based on subtree 3 920 and process 4 1010-4 may create the objects of peer subtree 4 1020-4 based on subtree 4 940.

Figure 11:
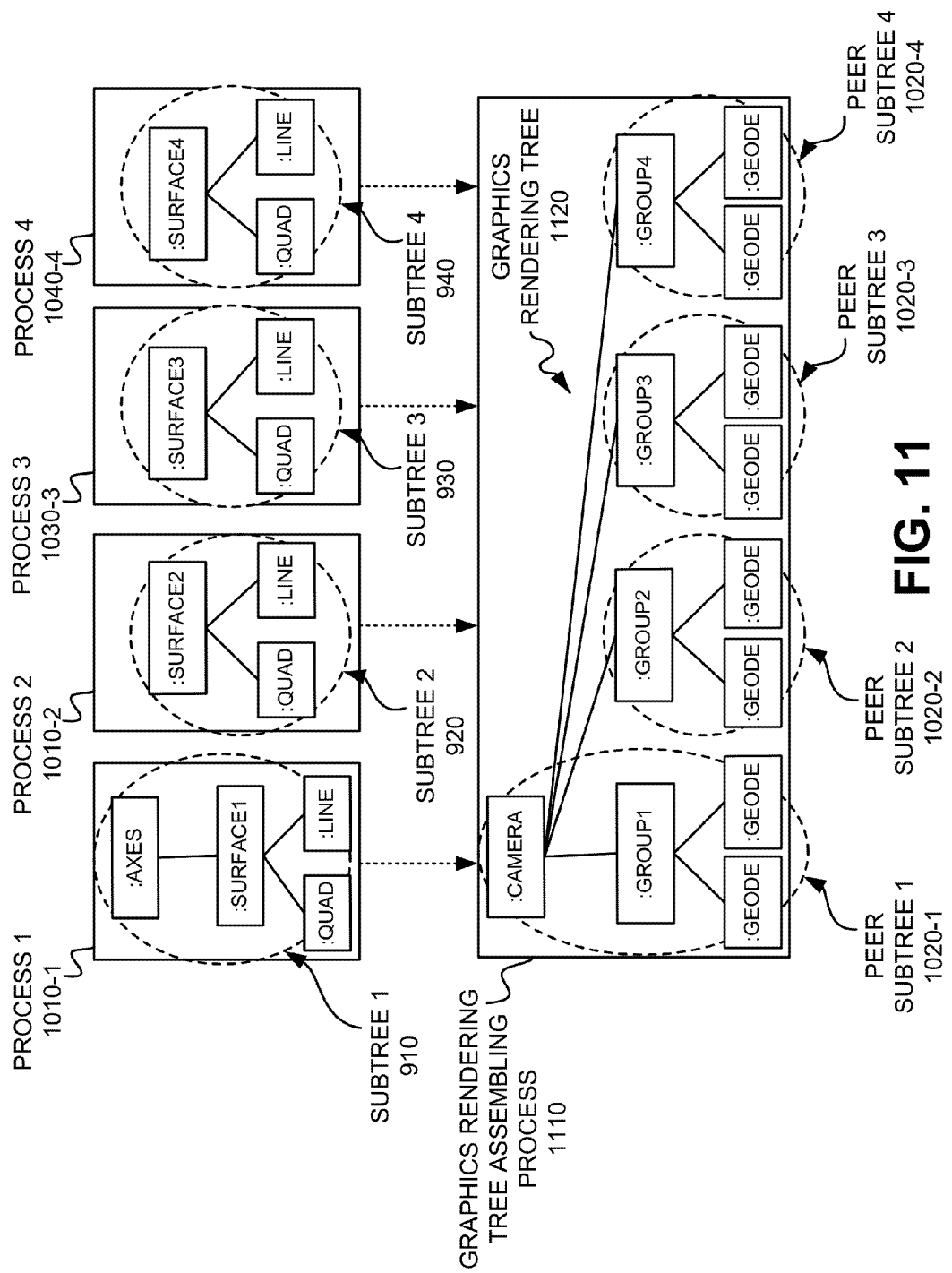
FIG. 11 is a diagram illustrating an example of assembling the peer subtrees of FIG. 10 into a graphics rendering tree.

At each parallel process, during peer object creation, selected object subtree data may be converted to a format that provides a certain performance from GPU 130 (block 650—FIG. 6B). GPU 130 may render graphics more efficiently when object data is in a preferred format. Therefore, selected data associated with objects of a respective object subtree may be converted to the preferred format prior to graphics rendering by GPU 130. For example, data associated with each object of subtrees 910, 920, 930 and 940, as depicted in FIG. 11, may be converted to a format the provides a certain performance from GPU 130. As a specific example, an object of subtree 910 may include three arrays of data, Z data, X data and Y data that represent object data points. The Z data may include an array of double precision values, the X data may include an array of 32 bit integer values, and the Y data may include an array of 32 bit integer values. The Z data, X data and Y data may be converted to an array of single precision floating point numbers. This exemplary data format conversion may be repeated for appropriate objects of each subtree 910, 920, 930 and 940 to convert the data associated with those objects to a format that provides a certain (e.g., best) performance from the GPU.

At each parallel process, the peer object(s) and commands may be sent to the graphics rendering tree assembling process (block 660). To send the peer object(s) and commands from one process to another, the peer object(s) and commands may, in one implementation, be serialized into a byte stream and then unserialized back into a peer object(s) and commands. For example, the properties of each of the peer objects may be converted into a sequence of bytes that can be used by the graphics rendering tree assembling process to re-create the peer objects with properties that are identical to the original peer objects. Referring to FIG. 10, process 1 1010-1 may serialize the objects of peer subtree 1 1020-1, and may serialize associated commands (not shown), and send them to process 1110 (shown in FIG. 11). Process 2 1010-2 may also serialize the objects of peer subtree 2 1020-2, and may serialize associated commands (not shown), and send them to process 1110. Process 3 1010-3 may serialize the objects of peer subtree 3 1020-3, and may serialize associated commands (not shown), and send them to process 1110. Process 4 1010-4 may further serialize the objects of peer subtree 4 1020-4, and associated commands (not shown), and send them to process 1110.

At the graphics rendering tree assembling process 1110 (FIG. 11), the graphics rendering tree may be assembled based on the received peer object(s) and commands (block 670). FIG. 11 depicts a process 1110 assembling graphics rendering tree 1120 using the peer objects of peer subtrees 1120-1, 1120-2, 1120-3 and 1120-4. Process 1110 may assemble peer subtrees 1020-1, 1020-2, 1020-3 and 1020-4 based on commands received from processes 1010-1 through 1010-4. Process 1110 may be a process that is separate from processes 1040-1, 1040-2, 1040-3 and 1040-4, or process 1110 may actually be the same process as one of processes 1040-1, 1040-2, 1040-3 or 1040-4 (i.e., one of processes 1040 may create a subtree and also assemble the entire graphics rendering tree using subtrees assembled at other processes).

Exemplary Graphics Rendering Process

Figure 12:
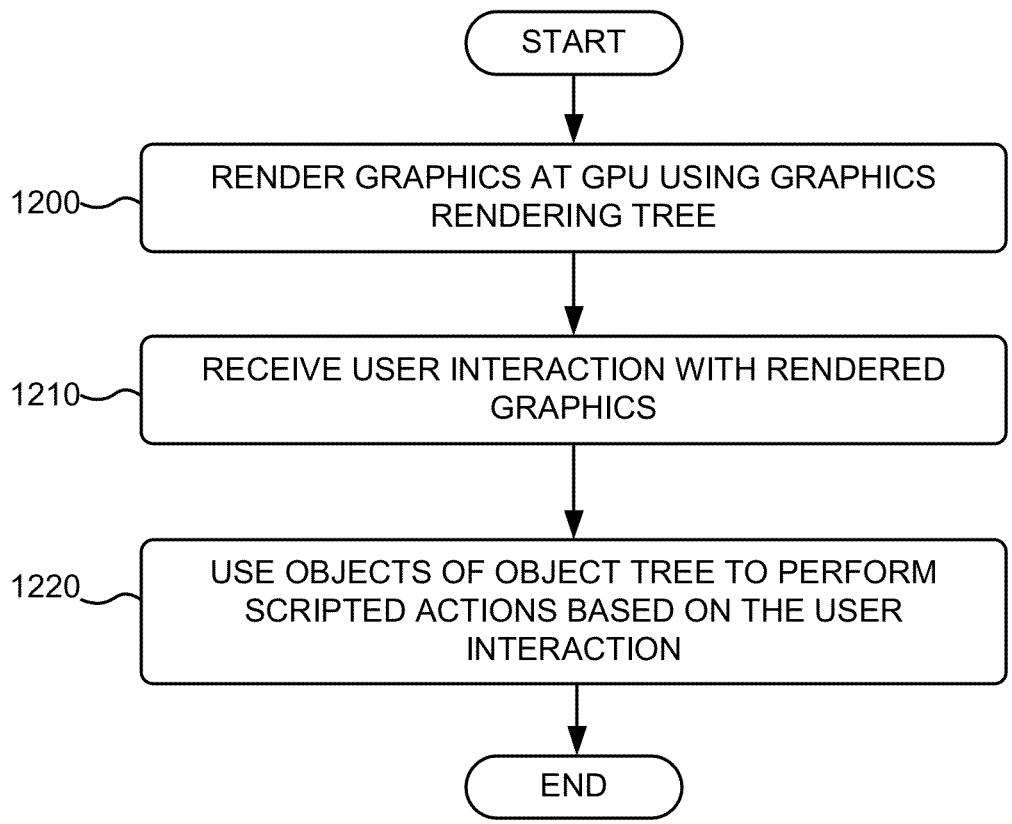
FIG. 12 is a flowchart of an exemplary process for rendering graphics based on a previously created graphics rendering tree.

FIG. 12 is a flowchart of an exemplary process for rendering graphics based on a previously created graphics rendering tree. Block 1200 of FIG. 12 may be implemented by specialized processing unit 130 (e.g., a GPU) of a client 310 or server 320, and blocks 1210 and 1220 of FIG. 26 may be implemented by processor 125 of client 310 or server 320.

Figure 13:
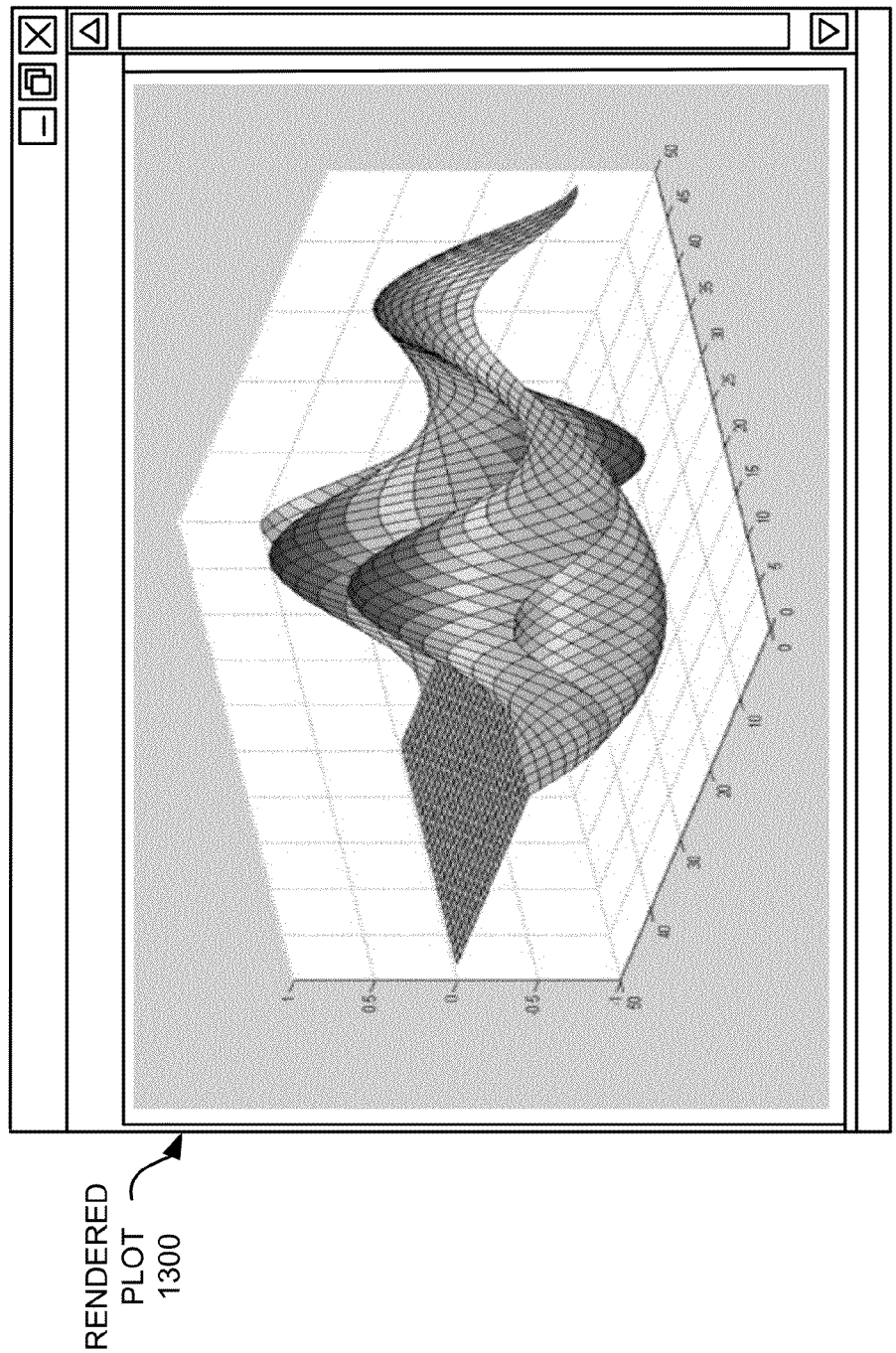
FIG. 13 illustrates an example of a graphics plot rendered using a graphics rendering tree.
Figure 14:
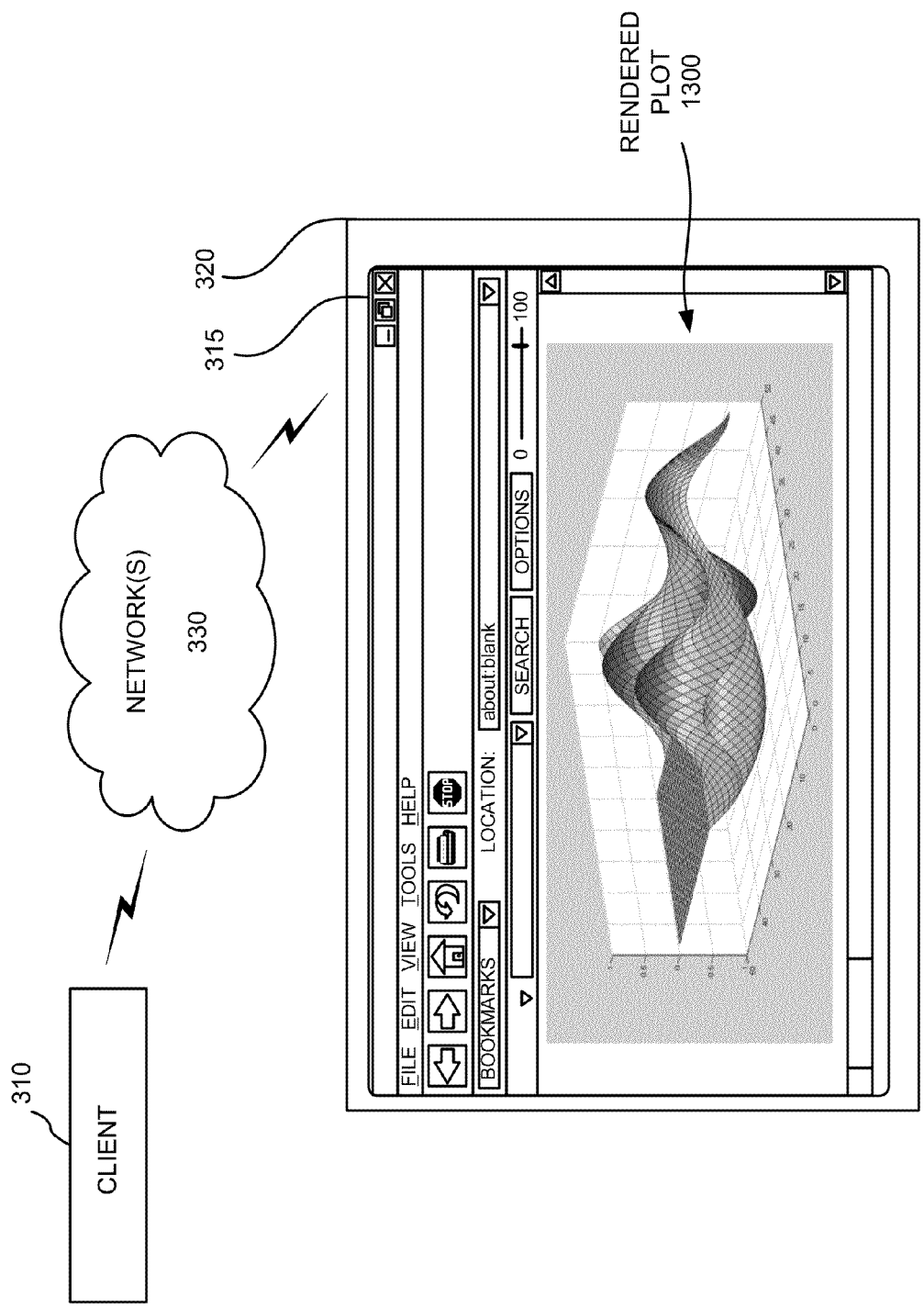
FIG. 14 illustrates another example of a graphics plot rendered using a graphics rendering tree.

The exemplary process may begin with the GPU rendering the graphics using the previously created graphics rendering tree (block 1200). For example, as shown in FIG. 13, the GPU may render a plot 1300 based on the graphics rendering tree 1120 of FIG. 11. In some implementations, plot 1300 may be displayed by browser 315, as shown in FIG. 14. Prior to the GPU rendering the graphics using the previously created graphics rendering tree, the contents of the graphics rendering tree may be re-ordered so that state changes can be minimized. For example, state attribute sorting may be used to re-order the contents of the graphics rendering tree prior to the GPU rendering the graphics. Because the GPU typically is deeply "pipelined," the speed of the graphics rendering may be significantly slowed when there are many changes in state. Therefore, improvements in performance (e.g., graphics rendering speed) may be obtained by rendering objects that have the same state together. For example, if a graphics scene uses many objects that have a same state (e.g., a same texture map), better performance may be obtained from the GPU if all of these objects together instead of switching between these and other objects.

User interaction with the rendered graphics may be subsequently received (block 1210). For example, the user may select a different view of the plot 1300. As another example, "mouse" motion events (i.e., movement of the mouse by the user) may change view parameters of a graphical scene.

As a further example, "mouse" selection events (e.g., mouse "click" at a location on the graphical scene) over the visual representation of an object may cause the "firing" of an event at the corresponding object. This event can trigger the execution of a function that has been written, for example, in a technical computing language. For instance, the occurrence of a mouse selection event may initiate the performance of a hit test computation. The hit test computation may include intersecting a ray cast from the mouse selection location against the objects of the graphics rendering tree. If the ray hits any of the objects of the graphics rendering tree, then the object for which the intersection point is nearest the origin of the ray may be considered the "hit" object. A cookie, or any other type of identifier, that marks this object may be used to determine what happens next.

In implementation, each object in the graphics rendering tree may be marked with a cookie that uniquely identifies the object in the object tree from which the object in the graphics rendering tree was created. The cookie may include two parts: the first part may uniquely identify the process where the object in the object resides and the second part may include an identifier that is unique within that process. These two parts may be concatenated to generate a globally unique identifier. When determining what happens next based on the cookie that marks the "hit" object, the first part of the cookie that identifies the process may be examined. This part may be used to determine which process to send a notification to. The notification may include the cookie, the ray and/or the intersection point. When the process receives the notification, it may look at the other portion of the cookie to determine which object of the object tree should "fire" the event.

Objects of the object tree may be used to perform scripted actions based on the user interaction (block 1220). For example, in response to the above-described "mouse" motion events, the graphical scene may be redrawn and updated view parameters may be sent back to an object in the object tree.

Additional Embodiments

Figure 15:
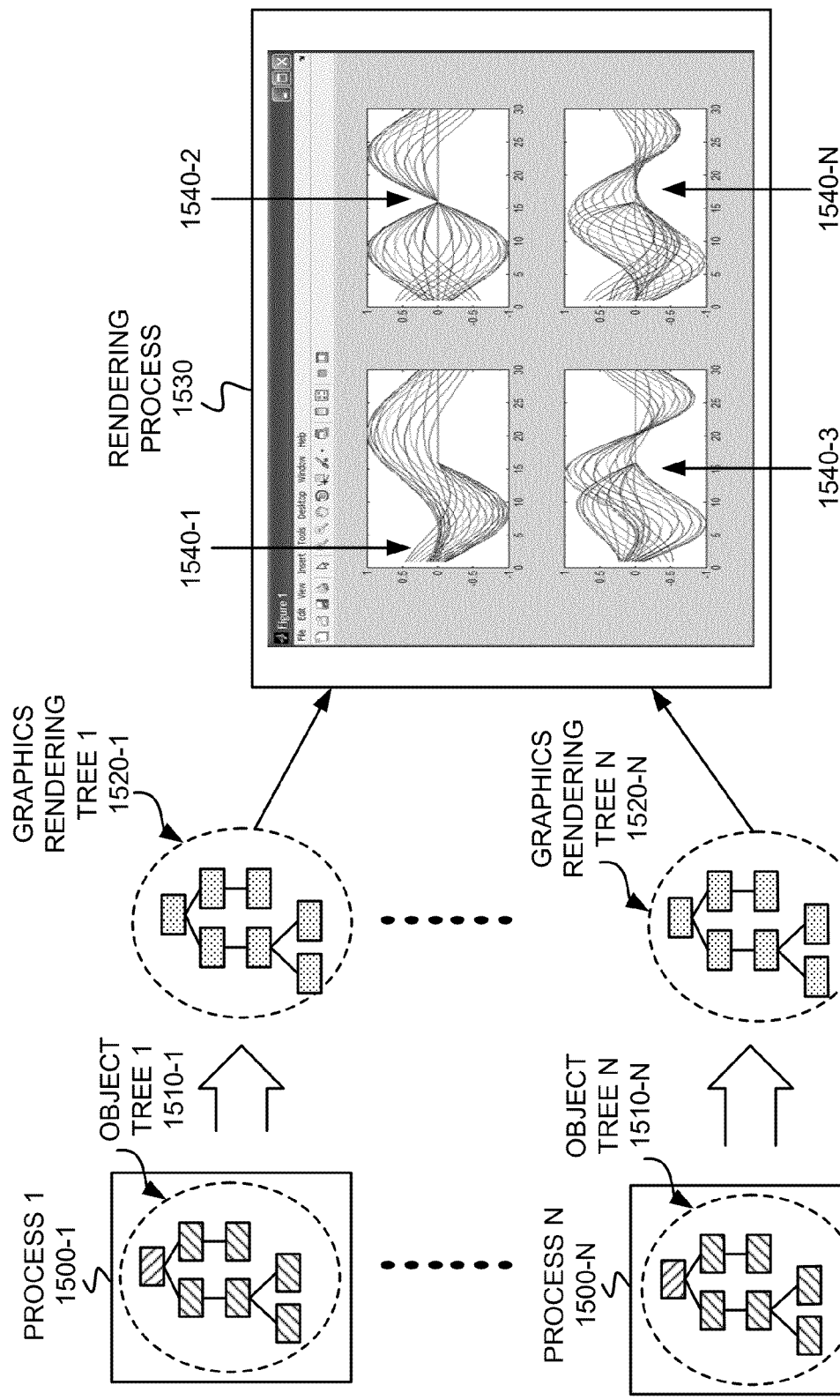
FIG. 15 graphically illustrates a first additional embodiment.
Figure 16:
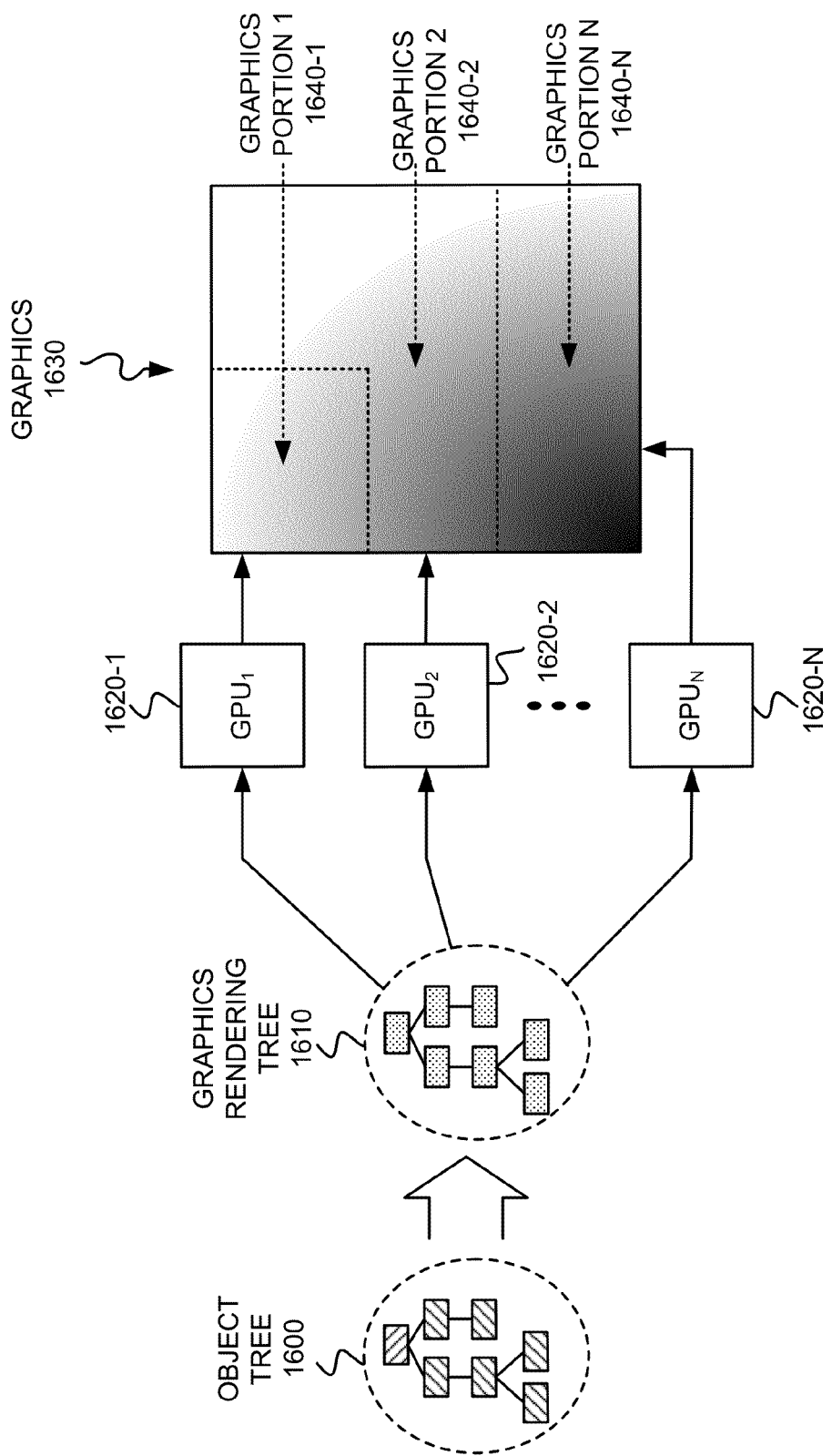
FIG. 16 graphically illustrates a second additional embodiment.

FIGS. 15 and 16 graphically illustrate additional exemplary embodiments in which some form of parallel or distributed processing is involved in graphical rendering. As shown in FIG. 15, multiple processes 1500-1 through 1500-N, executed in parallel, may create respective object trees 1510-1 through 1510-N for describing graphical scenes. Respective graphics rendering trees 1520-1 through 1520-N may further be created based on object trees 1500-1 through 1500-N. The multiple graphics rendering trees 1520-1 through 1520-N may be gathered and used by a single rendering process 1530 to render multiple plots 1540-1 through 1540-N corresponding to respective ones of the graphics rendering trees 1520-1 through 1450-N.

FIG. 16 illustrates a distributed rendering technique in which the rendering process is broken into multiple tasks that may be performed by multiple GPUs. As shown in FIG. 16, an object tree 1600, which describes a graphical scene, may be used to create a graphics rendering tree 1610. The various objects of graphics rendering tree 1610 may be selectively distributed to multiple GPUs 1620-1 through 1620-N to render portions of the graphics 1630 of the graphical scene. For example, as shown in FIG. 16, graphics portion 1 1640-1 of graphics 1630 may be rendered by $GPU_1$ 1620-1, graphics portion 2 1640-2 of graphics 1630 may be rendered by $GPU_2$ 1620-2 and graphics portion N 1640-N of graphics 1630 may be rendered by $GPU_N$ 1620-N. In one implementation, graphics portion 1 1640-1 may correspond to a first set of objects of graphics rendering tree 1610, graphics portion 2 1640-2 may correspond to a second set of objects of graphics rendering tree 1610 and graphics portion N 1640-N may correspond to a third set of objects of graphics rendering tree 1610.

Two different exemplary schemes may be employed in distributed rendering. In a first scheme, which employs sort-first rendering, the graphical scene may be divided into multiple "tiles." The objects of graphics rendering tree 1610 may then be sorted geometrically and each object may be sent to the tile(s) in which it will be rendered. In this technique, a single object may "hit" multiple tiles and may, therefore, get sent to multiple processes and then rendered into each tile. In a second scheme, which employs sort-last rendering, each rendering process receives a subset of the objects in graphics rendering tree 1610. Each rendering process renders these objects into a full sized graphics window, saved the resulting color and depth information. The graphics that result from these renderings may be assembled in a single process and the depth information may be used to determine which color should be used for each pixel.

CONCLUSION

Implementations described herein provide illustration and description, but are not intended to be exhaustive or to limit the invention to the precise form disclosed. Modifications and variations are possible in light of the above teachings, or may be acquired from practice of the invention. For example, while a series of blocks have been described with regard to FIGS. 6A, 6B and 12, the order of the blocks may be modified in other implementations. Further, non-dependent blocks may be performed in parallel. Some implementations have been described herein with respect to a graphics rendering tree being organized and optimized for use by a GPU. However, it will be appreciated that the embodiments described herein may be equivalently applied to peer object trees organized and optimized for use with other specialized processing units, such as, for example, PPUs or DSPs. Additionally, implementations have been described herein with respect to a general purpose CPU and a specialized processing unit. In other implementations, a first object tree may be associated with a first type of CPU and a second object tree may be associated with a second type of CPU, where the second type of CPU may be faster and/or have additional capabilities as compared to the first type of CPU.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, block or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
one or more instructions, executable by at least one processor, to cause the at least one processor to:
receive data for graphical rendering;
distribute a first portion of the data to a first computation process;
distribute a second portion of the data to a second computation process,
the second portion of the data being different than the first portion of the data, and
the second computation process being different than the first computation process;
create a first data structure via the first computation process using the first portion of the data;
create a second data structure via the second computation process using the second portion of the data;
assemble an object tree via a third computation process using the first data structure and the second data structure; and
provide the assembled object tree to a browser for rendering a graphical scene.

2. The computer-readable medium of claim 1, where the first computation process and the second computation process occur in parallel.

3. The computer-readable medium of claim 1, where the first data structure is a first data tree and the second data structure is a second data tree.

4. The computer-readable medium of claim 1, where the one or more instructions to create the first data structure include:
one or more instructions to retrieve one or more objects from a library,
one or more properties associated with the one or more retrieved objects being based on one or more parameters specified by a user; and
one or more instructions to use the one or more retrieved objects to create the first data structure.

5. The computer-readable medium of claim 1, where the instructions further comprise:

one or more instructions to distribute a third portion of the data to a fourth computation process;
one or more instructions to create a third data structure via the fourth computation process using the third portion of the data; and
one or more instructions to assemble the object tree using the first data structure, the second data structure, and the third data structure.

6. The computer-readable medium of claim 1, where
the first data structure is created at a client,
the second data structure is created at a server that is remote from the client, and
the browser is to render the graphical scene at the client.

7. The computer-readable medium of claim 1, where
the first data structure and second data structure are created at a server, and
the browser is to render the graphical scene at a client that is remote from the server.

8. A system comprising:
a memory to store instructions;
one or more processors to execute the instructions to:
  receive data for graphical rendering;
  distribute a first portion of the data to a first computation process;
  distribute a second portion of the data to a second computation process,
    the second portion of the data being different than the first portion of the data, and
    the second computation process being different than the first computation process;
  create a first data structure via the first computation process using the first portion of the data;
  create a second data structure via the second computation process using the second portion of the data;
  assemble an object tree via a third computation process using the first data structure and the second data structure; and
  provide the assembled object tree to a browser for rendering a graphical scene.

9. The system of claim 8, where the first computation process and the second computation process occur in parallel.

10. The system of claim 8, where the first data structure is a first data tree and the second data structure is a second data tree.

11. The system of claim 8, where the one or more processors, when creating the first data structure, are further to:
retrieve one or more objects from a library,
  one or more properties associated with the one or more retrieved objects being based on one or more parameters specified by a user; and
use the one or more retrieved objects to create the first data structure.

12. The system of claim 8, where the one or more processors are further to:
distribute a third portion of the data to a fourth computation process;
create a third data structure via the fourth computation process using the third portion of the data; and
assemble the object tree using the first data structure, the second data structure, and the third data structure.

13. The system of claim 8, where
the first data structure is created at a client,
the second data structure is created at a server that is remote from the client, and
the browser is to render the graphical scene at the client.

14. The system of claim 8, where
the first data structure and second data structure are created at a server, and
the browser is to render the graphical scene at a client that is remote from the server.

15. A method comprising:
receiving data for graphical rendering,
  the receiving the data being performed by one or more computing devices;
distributing a first portion of the data to a first computation process,
  the distributing the first portion of the data being performed by the one or more computing devices;
distributing a second portion of the data to a second computation process,
  the second portion of the data being different than the first portion of the data,
  the second computation process being different than the first computation process, and
  the distributing the second portion of the data being performed by the one or more computing devices;
creating a first data structure via the first computation process using the first portion of the data,
  the creating the first data structure being performed by the one or more computing devices;
creating a second data structure via the second computation process using the second portion of the data,
  the creating the second data structure being performed by the one or more computing devices;
assembling an object tree via a third computation process using the first data structure and the second data structure,
  the assembling the object tree being performed by the one or more computing devices; and
providing the assembled object tree to a browser for rendering a graphical scene,
  the providing the assembled object tree being performed by the one or more computing devices.

16. The method of claim 15, where the first computation process and the second computation process occur in parallel.

17. The method of claim 15, where the first data structure is a first data tree and the second data structure is a second data tree.

18. The method of claim 15, where, when creating the first data structure, the method includes:
retrieving one or more objects from a library,
  one or more properties associated with the one or more retrieved objects being based on one or more parameters specified by a user; and
using the one or more retrieved objects to create the first data structure.

19. The method of claim 15, where
the first data structure is created at a client,
the second data structure is created at a server that is remote from the client, and
the browser is to render the graphical scene at the client.

20. The method of claim 15, where
the first data structure and second data structure are created at a server, and
the browser is to render the graphical scene at a client that is remote from the server.

* * * * *